(12) United States Patent
Oberhaus

(10) Patent No.: US 7,472,943 B2
(45) Date of Patent: Jan. 6, 2009

(54) WINDOW PANE ASSEMBLY AND BODYWORK ELEMENT FOR A VEHICLE

(75) Inventor: Peter Oberhaus, Paehl (DE)

(73) Assignee: Webasto AG, Stockdorf (DE)

( * ) Notice: Subject to any disclaimer, the term of this patent is extended or adjusted under 35 U.S.C. 154(b) by 14 days.

(21) Appl. No.: 11/573,838

(22) PCT Filed: Aug. 3, 2005

(86) PCT No.: PCT/DE2005/001388

§ 371 (c)(1),
(2), (4) Date: Feb. 16, 2007

(87) PCT Pub. No.: WO2006/018003

PCT Pub. Date: Feb. 23, 2006

(65) Prior Publication Data

US 2007/0210622 A1    Sep. 13, 2007

(30) Foreign Application Priority Data

Aug. 16, 2004   (DE) .................. 10 2004 039 690

(51) Int. Cl.
*B60J 1/00* (2006.01)
*B60J 7/00* (2006.01)
(52) U.S. Cl. .................. 296/146.16; 296/216.01; 49/34; 160/354
(58) Field of Classification Search .............. 49/34, 49/48; 160/352, 354, DIG. 8; 296/146.16, 296/216.01, 216.02
See application file for complete search history.

(56) References Cited

U.S. PATENT DOCUMENTS 1,011,940 A * 12/1911 Gilson .................. 160/180

1,294,879 A * 2/1919 Davis .................. 160/90
1,643,939 A * 10/1927 Becker .................. 160/90

(Continued)

FOREIGN PATENT DOCUMENTS

DE           692676       6/1940

(Continued)

OTHER PUBLICATIONS

International Search Report for International Application No. PCT/DE2005/001388.

*Primary Examiner*—Dennis H Pedder
(74) *Attorney, Agent, or Firm*—David S. Safran; Roberts Mlotkowski Safran & Cole, P.C.

(57) ABSTRACT

A pane arrangement for closing an opening in the outer shell of the motor vehicle, has a closed position tightly closing the opening, and an open position partially clearing the opening. A flexible pane is connected without hinges to the vehicle to seal the opening. At least a first partial region of the pane is permanently connected to the outer shell of the vehicle, and at least a second partial region of the pane can be bent out of the closed position by deformation of the pane. Similarly, a body element of a motor vehicle with contains a flexible plate which is connected to the vehicle without hinges, at least a first partial region of the plate being permanently connected to the outer vehicle shell, and at least a second partial region of the plate being able to be bent away from the outer vehicle shell.

21 Claims, 12 Drawing Sheets

U.S. PATENT DOCUMENTS

| | | | | |
|---|---|---|---|---|
| 2,470,921 | A | * | 5/1949 | Dow .......................... 160/352 |
| 2,843,201 | A | * | 7/1958 | Laubenthal ................. 160/354 |
| 3,398,483 | A | * | 8/1968 | Ringel et al. .................... 49/34 |
| 3,521,403 | A | * | 7/1970 | Bouwkamp ................. 49/324 |
| 3,797,167 | A | * | 3/1974 | Gomboc ...................... 49/141 |
| 4,281,476 | A | | 8/1981 | LeVan |
| 4,408,416 | A | * | 10/1983 | Davlantes .................... 49/168 |
| 4,540,622 | A | * | 9/1985 | Brunion et al. ............. 428/216 |
| 4,639,035 | A | * | 1/1987 | Isaacson ...................... 296/218 |
| 4,938,169 | A | * | 7/1990 | Barmakian ................. 119/622 |
| 5,417,273 | A | * | 5/1995 | Bamonte ................. 160/368.1 |
| 6,240,676 | B1 | * | 6/2001 | Cornils et al. ................. 49/324 |
| 7,147,923 | B2 | * | 12/2006 | Roberts et al. ........... 428/423.3 |

FOREIGN PATENT DOCUMENTS

DE              2934977 A1     3/1980

* cited by examiner

WINDOW PANE ASSEMBLY AND BODYWORK ELEMENT FOR A VEHICLE

BACKGROUND OF THE INVENTION

1. Field of the Invention

This invention relates to a pane arrangement for a motor vehicle for closing an opening provided in the outer shell of the motor vehicle, with a closed position in which the opening is tightly closed, and an open position in which the opening is partially cleared, and to a body element for a motor vehicle with a first position in which the body element rests on the outer shell of the vehicle, and a second position in which the body element is raised partially off the outer shell of the vehicle.

2. Description of Related Art

Pane arrangements for motor vehicles with a closed position in which an opening in the outer shell of the vehicle is sealed tight, and an open position in which at least part of this opening is cleared, are known in various embodiments. Thus, for example, side panes for motor vehicles are generally supported to be movable such that the panes can be lowered down in the vehicle door or vehicle body by means of a crank or electric drive for clearing an opening. If the opening in the vehicle shell is a roof opening which is sealed by a cover with a pane in the closed position, to clear the opening, the cover together with the pane, for example, can be pivoted to the outside around a hinge element on the front of the cover or the cover can be moved and guided away from the roof opening along a guide means. Furthermore, pivoting of the side panes (for example, in the rear area of the side surface of the vehicle) which are pivotally supported on their front edge in the region of their rear edge to the outside in order to at least partially clear an opening for ventilation purposes is known.

However, existing pane arrangements for motor vehicles in which at least part of the opening is to be cleared in the open position have the disadvantage that complex mechanisms, hinges or other components are required for opening in order to move the pane into the open position. Generally, the panes which can be moved into the open position are made of glass and generally vehicle glazing which is permanently installed is made of plastic (for example, polycarbonate). Furthermore, in vehicle glazing of plastic, a comparatively major effort is generally expended to stiffen the more flexible plastic material in order to approach the properties of glass as closely as possible. This results in high costs for mechanisms, a correspondingly high weight by these mechanisms and by use of glass, and also comparatively high technical effort (and thus higher costs) in order to seal the pane arrangements in the closed state. Stationary glazing has the disadvantage that it does not offer a ventilation function.

SUMMARY OF THE INVENTION

Thus, the object of this invention is to devise a pane arrangement for a motor vehicle of the initially mentioned type in which an economical and weight-saving design can be attained.

This object is achieved by a pane arrangement of the initially mentioned type for closing an opening provided in the outer shell of the motor vehicle, in which, to seal the opening, there is a flexible pane which is connected without hinges to the vehicle, at least a first partial region of the pane being permanently connected to the outer shell of the vehicle, and for clearance of the opening, at least a second partial region of the pane can be bent out of the closed position by deformation of the pane.

In this design in accordance with the invention, it is advantageous that the pane is not moved or turned around a hinge-link joint in the transition from the closed position into the open position, but the pane is bent out of the closed position at least in the second partial region, by which costly and production-intensive rotation and displacement elements can be omitted. Furthermore, in the approach in accordance with the invention, it is advantageous that the weight can be reduced by omitting these rotation and displacement elements. Moreover, the approach in accordance with the invention opens completely new configuration possibilities in motor vehicle construction.

Other preferred embodiments of the invention will become apparent from the detailed description below.

The opening can be a roof opening which is provided in the fixed roof surface, the roof opening of a roof module, or also a window opening.

Preferably, at least one second partial region of the pane can be flexibly bent to the inside or outside for clearing the opening, and in especially preferred embodiments, can be fixed in this position by a suitable mechanism. This elastic bending of the pane can take place manually or by means of an electric drive.

The at least one second partial region can rest on a support surface in the closed position, and the support surface can be part of the vehicle shell, and in preferred embodiments, is cemented to it. Of course, other manners of attachment, such as screws, etc., are also possible. In other preferred embodiments, the opening is surrounded with a carrier frame to which then at least one partial region is permanently joined. The carrier frame can be preferably punched out of sheet metal, deep-drawn or produced (for example, injection molded) from plastic. Thus, it is possible to prefabricate a complete window module which then can be inserted into a corresponding opening of the vehicle.

The carrier frame, in other preferred embodiments, is connected to at least the first partial region of the pane by means of having been foamed (for example, polyurethane) around the edge of the pane. Additional reinforcing elements can be foamed into this foamed edge. Alternatively, the carrier frame can be cemented to the pane. In the two embodiments—with and without the carrier frame—the connection to the pane can be reinforced at especially loaded points (for example, using rivets, screws or equivalent fastening methods). This relates especially to the transition region between the first and the second partial region of the pane, since here, otherwise, under undue stress posses the danger of the second partial region tearing away the first partial region when it is bent out.

In other preferred embodiments of the invention, the at least one second partial region of the pane is supported at least partially by a reinforcing frame which can have flexibility which is different from the that of pane or which can even be completely rigid. A flexible design can be achieved in this connection, for example, by use of an articulated profile.

Preferably, between the at least one second partial region and the support surface there is at least one sealing element in order to achieve sealing against ambient effects in the closed state of the pane. These sealing elements can be attached to the pane or to the support surface or on both sides. In addition, sealing surfaces can be attached to the surfaces on which these sealing elements rest in the closed position of the pane in order to improve the sealing action. The sealing elements completely surround the opening in especially preferred embodiments.

In the pane arrangement in accordance with the invention, preferably, transparent or translucent panes are used. This means that the panes can be both crystal-clear or also tinted or colored. The panes can be made, for example, of a plastic, preferably, polycarbonate.

In another embodiment of the invention, the pane is made essentially tetragonal (preferably, with rounded corners) and is bent along one of its diagonals. This means that two abutting edges of the pane are permanently connected to the outer shell of the vehicle, and thus, clamp the first partial region, while the two other abutting edges of the pane are not permanently connected to the outer shell of the motor vehicle, and thus, clamp the second partial region.

In preferred embodiments of the invention, the pane can have a material weakening along its bending line, i.e., between the at least first partial region and the at least second partial region. This can be, for example, a molded or routed groove, the material weakening being made such that it reduces the necessary force for bending the pane and/or the bending radius.

In another embodiment of the invention, an essentially tetragonal pane is exposed along three abutting edges, i.e., is not connected permanently to the vehicle shell, these edges clamping the second partial region which can be bent up, while the fourth edge of the pane is permanently connected to the vehicle shell.

In another preferred embodiment of the invention, the pane has at least one slot which separates the pane into a first partial region which is stationary with respect to the outer shell of the vehicle and a second partial region which can be bent out of the plane of the outer vehicle shell and which is connected to the first partial region by means of the bending edge. This slot can run essentially U-shaped or V-shaped in the inner region of the pane, while the pane is connected permanently on the periphery to the outer vehicle shell.

In other preferred embodiments of the invention, the pane arrangement is provided with at least one raising device in order, on the one hand, to bend the second partial region of the pane to the outside, and on the other hand, to keep it in the raised position against the resetting spring force of the elastically deformed pane. The raising device can have a raising element which is coupled to the pane in the second partial region, and to clear the opening, it bends the pane at least in the second partial region. In this connection, the raising element can be extended or swung out by hand or electrically.

Preferably, the raising element for clearing the opening can be moved between the second partial region and a vehicle-mounted opposing surface such that the pane, at least in the second partial region, can be bent up or arched, for example, by the wedge action of the raising element. In the preferred embodiments, the raising device can have a guide rail, in which the raising element is guided. In this connection, the guide rail is mounted on the body and is connected to at least the second partial region of the pane, and the raising element is accordingly coupled to at least the second partial region of the pane or is mounted on the body such that displacement of the raising element in the guide rail leads to bending-up or arching of at least the second partial region. This can be achieved, for example, in that the guide rail has a corresponding guide path or by the raising element being able to be extended or swung out or by the wedge action of the raising element.

In other preferred embodiments of the invention, there are fastening elements at at least two points within the second partial region and the raising device has a pulling or pressing device which acts on the fastening elements in order to move the fastening elements relative to one another. In this way, the second partial region of the pane is compressed to clear the opening and deflects in the shape of an arc to the outside, the pane being elastically deformed. The fastening elements can be guided in body-mounted guide rails in order to prevent, for example, raising of the second partial region over the entire surface.

Preferably, the pulling or pressing device has a rod with opposite threaded sections which are connected to the corresponding opposing threads in the fastening elements such that rotation of the rod around the lengthwise axis moves the two fastening elements relative to one another.

In preferred embodiments of the invention, the rod is driven by a worm wheel which interacts with the teeth of the rod in order to turn the rod around its lengthwise axis.

In other embodiments, the second partial region of the pane can be located in the roof region of the vehicle and can be bent in the open position such that it can also assume a spoiler function in addition to the ventilation function.

The above described concept can be used in motor vehicles not only in pane arrangements for closing an opening in the outer shell of the motor vehicle, but also for other raisable body elements which are not designed to close an opening, but have other functions such as, for example, spoilers or wind deflectors which can thus be more easily implemented with reduced weight.

In particular, in accordance with the invention, a body element of a motor vehicle is proposed with a first position in which the body element rests on the outer shell of the vehicle, and a second position in which the body element is raised partially off the outer shell of the vehicle, the body element containing a flexible plate which is connected to the vehicle without hinges, and at least a first partial region of the plate being permanently connected to the outer vehicle shell, and in the second position at least a second partial region of the plate being bent away by its deformation from the outer vehicle shell.

Preferred embodiments are aerodynamic elements such as, for example, raisable spoilers, wind deflectors and the like.

It goes without saying that all the described embodiments of pane arrangements can be implemented accordingly in the body elements in accordance with the invention.

The invention is explained in detail below with reference to the accompanying drawings by way of example.

DETAILED DESCRIPTION OF THE INVENTION

Figure 1:
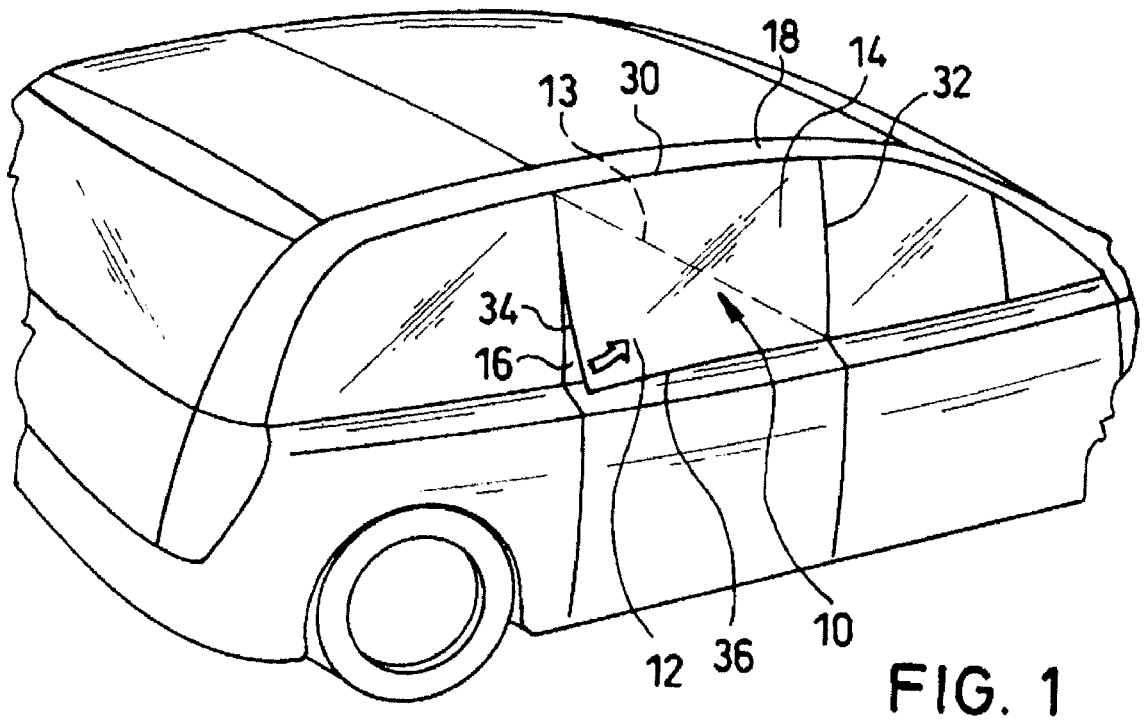
FIG. 1 is a perspective view of a motor vehicle with a side pane in accordance with the invention in the open position.

FIG. 1 shows a pane arrangement in accordance with the invention for a motor vehicle. In this perspective view of the side surface of the vehicle, a pane 10 can be seen which the second partial region 12 is bent up to the outside in the direction of the arrow, by which an opening 16 is cleared. A first partial region 14 of the pane is not bent here. Since the pane 10 is flexible, it can be easily released to close the opening 16, by which it moves elastically back into the initial position (closed position). The pane 10 of FIG. 1 is made essentially rectangular and is bordered by four edges 30, 32, 34, 36. The front and top edges 30, 32 are permanently connected to the vehicle shell, for which reason they are not moved or bent during the opening process. The front edge 32 and the top edge 30 of the pane 10 abut one another in an upper forward corner region (top right in the figure), and fix the first partial region 14 of the pane 10. The bottom and rear edges 36, 34 which lie opposite the edges 30, 32, in contrast to the edges 30, 32, are not connected to the vehicle shell either at all or at least not in the corner region of the pane 10 in which they meet one another. Thus, edges 34, 36, fix the second partial region 12 which is bent to the outside in the opening process.

In the illustrated and in all other embodiments of the invention, the second partial region 12 is that part of the pane 10 which is moved in the transition from the closed position into the open position or vice versa by the bending of the pane 10. Both partial regions constitute triangles which are separated by an (imaginary) parting line 13 which runs diagonally across the pane.

The pane 10 can be made transparent or translucent and is made of a plastic, such as, for example, polycarbonate. However, of course, it is also possible to produce this pane from an opaque material or to work or coat a transparent pane such that it is no longer transparent, but translucent or completely opaque if this should be desirable.

Figure 2:
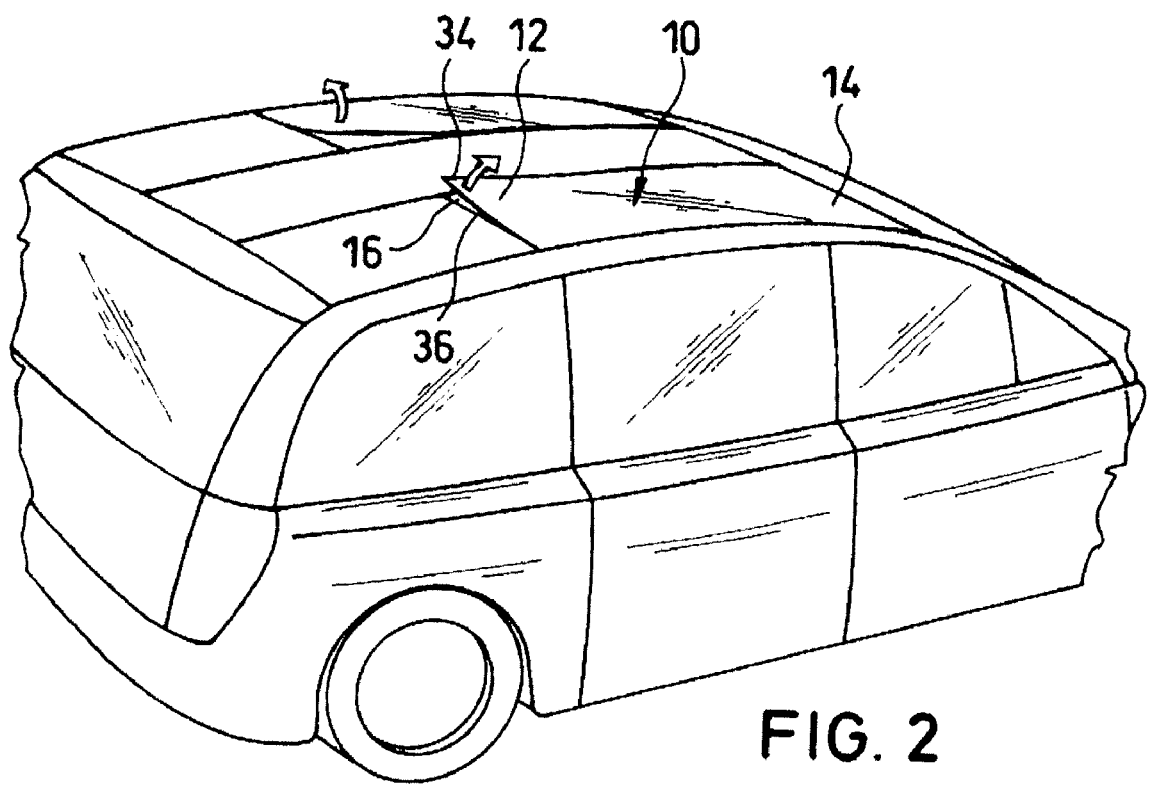
FIG. 2 is a perspective view of a motor vehicle with two pane arrangements in accordance with the invention for roof openings of a vehicle roof.

Similar to that of FIG. 1, FIG. 2 shows a perspective view of a motor vehicle, but in this case there are two pane arrangements in accordance with the invention for opening or closing roof openings 18. However, it can also be a roof which is made as part of a vehicle body, or a roof module. It is a roof module when it is a prefabricated roof (including the headliner and other parts) which is connected to the vehicle body only after pre-installation (such as by being cemented or screwed on, for example).

Here, similarly to FIG. 1, each pane 10 is divided into a first partial region 14 and a second partial region 12, which differ, in turn, in that the second partial region is bent outward into the open position of the pane 10 since the region of its edges 34, 36 is not permanently connected to the outer shell 18 of the vehicle while the edges 30, 32 of the first partial region 14 are permanently connected to the outer shell 18 of the vehicle.

Figure 3:
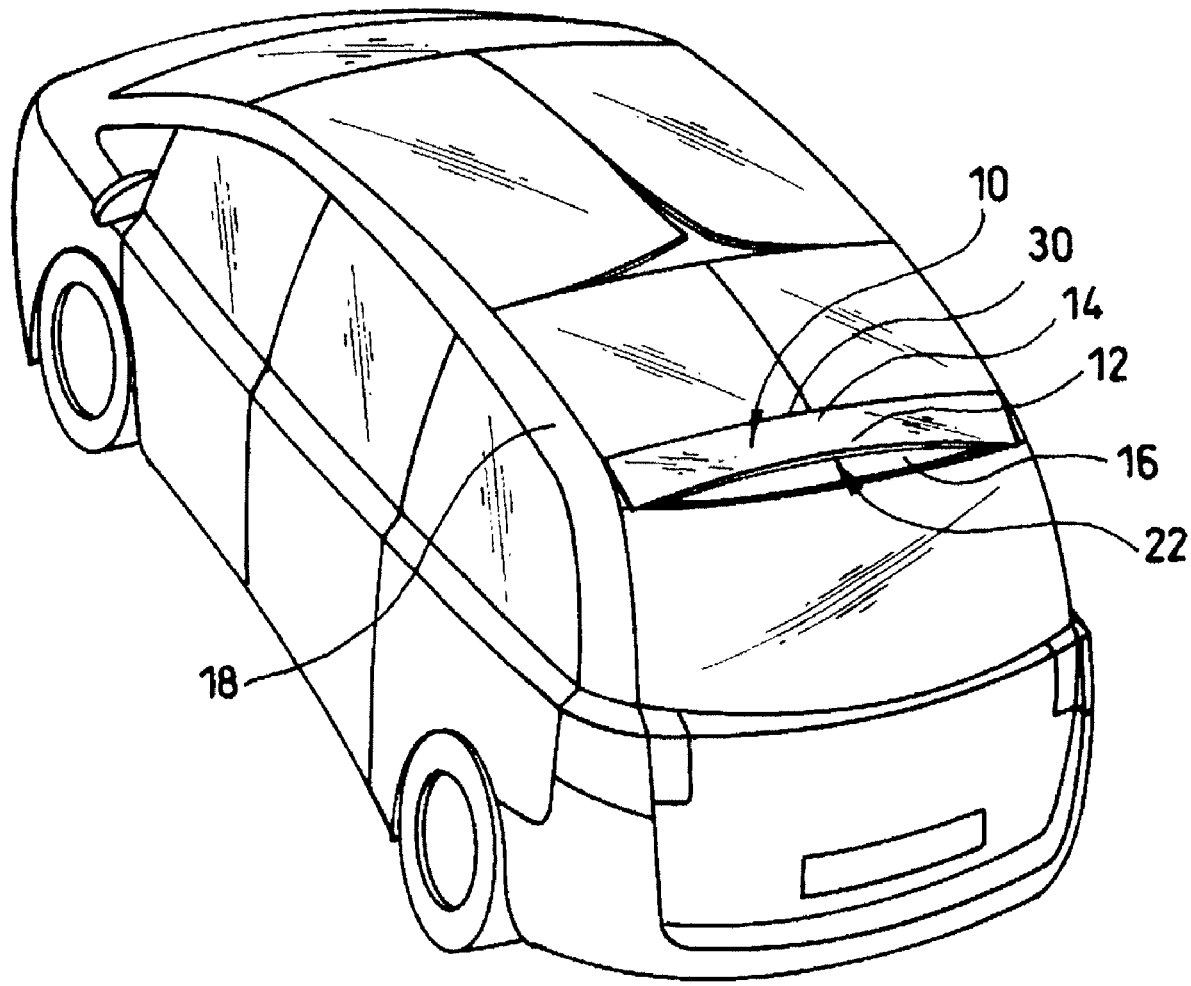
FIG. 3 shows a motor vehicle roof with two pane arrangements in accordance with the invention which are provided in the roof and with a pane arrangement along the rear edge of the vehicle roof in which a spoiler action is produced by the pane in the open position.

FIG. 3 shows a pane arrangement in accordance with the invention in the roof area of the outer shell 18 of a motor vehicle in which, on the one hand, there are two pane arrangements in the forward region of the roof surface which can be bent up, and on the other hand, there is another pane 10 which can be bent up along the rear edge of the roof surface for which, in the open position, a second partial region 12 of the pane 10 is bent such that it assumes a spoiler function. This is ensured by the second partial region 12 being curved upward in the manner of an arc on the rear top edge of the motor vehicle, by which an opening 16 in the outer shell 18 of the vehicle is exposed, for example, for ventilation purposes. In this case, a first partial region 14 is permanently connected to the vehicle shell 18 at its front edge 30, as a result of which, this edge is not bent.

Figure 4:
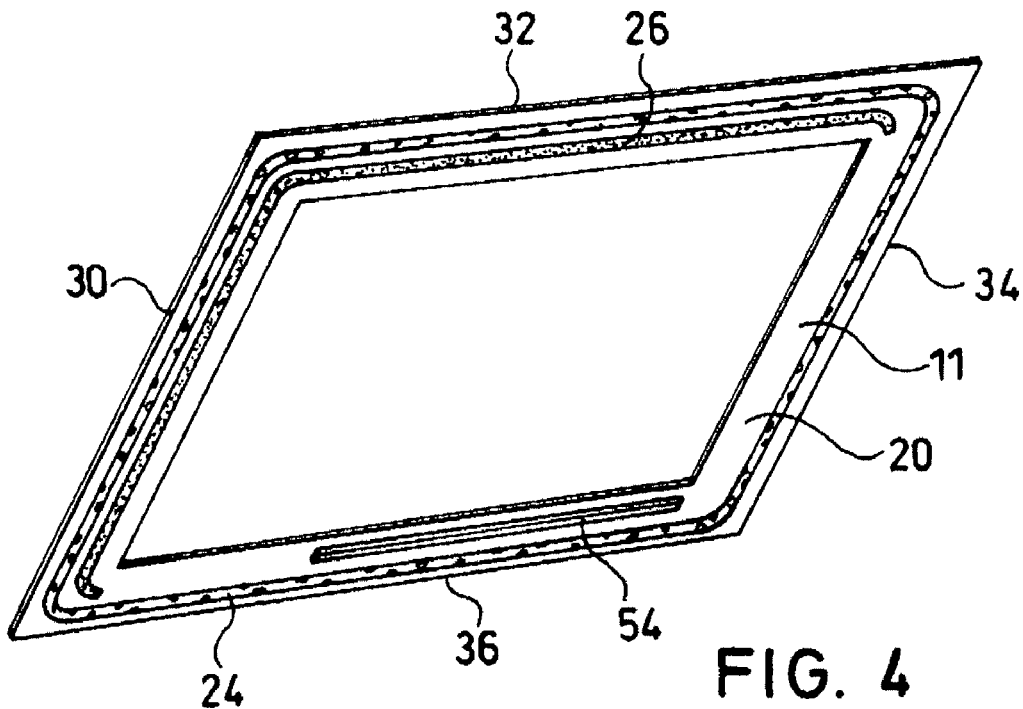
FIG. 4 is a perspective view of a carrier frame for a pane arrangement in accordance with the invention.

FIG. 4 shows a carrier frame 11 which can be produced from sheet metal or plastic and onto which a pane is fixed during the production process. In the mounted state, this carrier frame 11 is connected to a vehicle body (which is not shown here) and surrounds an opening in the vehicle shell. One alternative to use of such a carrier frame 11 would be a direct connection of a pane to the vehicle shell by the first partial regions of the pane being cemented directly to the vehicle body, so that the second partial regions of the pane can be bent up. If a carrier frame 11 as shown in FIG. 4 is used, it can be cemented to a pane or a connection to the pane can be achieved by the carrier frame being connected to the pane by means of having been foamed around the edge of the pane. For cementing, in the carrier frame 11 of FIG. 4, a cement bead 26 is used which is applied only to the regions of the carrier frame at which the first partial regions of the pane are applied and which are to remain permanently connected to the carrier frame during the opening process. In the case of FIG. 4, it is the edges 30, 32 that are cemented to the pane while the opposing edges 34, 36 are not cemented to the pane, since the pane is to be bent outward in the region of these edges during the opening process.

In order for the complete outer periphery of the carrier frame 11 to seal with the pane, a peripheral seal 24 is provided. Fundamentally, the seal 24 can be made in one piece and can be attached only to the carrier frame 11, or alternatively the seal can also be attached to the pane instead of to the carrier frame, and ultimately of course, also both of these elements can be provided with seals. While the seal 24 offers an additional sealing action to the cement bead 26 in the region of the edges 30, 32 of the carrier frame 11, it also enables the pane arrangement to be windproof and watertight in the closed state in the region of the support surface 20 of the edges 34, 36, where the pane is not cemented to the carrier frame.

In addition to cementing by means of the cement bead 26, on the ends of the cement bead, additional fixing points in the form of screw joints, rivets or the like can be attached to prevent the cementing from being torn out at these highly stressed points when the pane is bent up.

Figure 5:
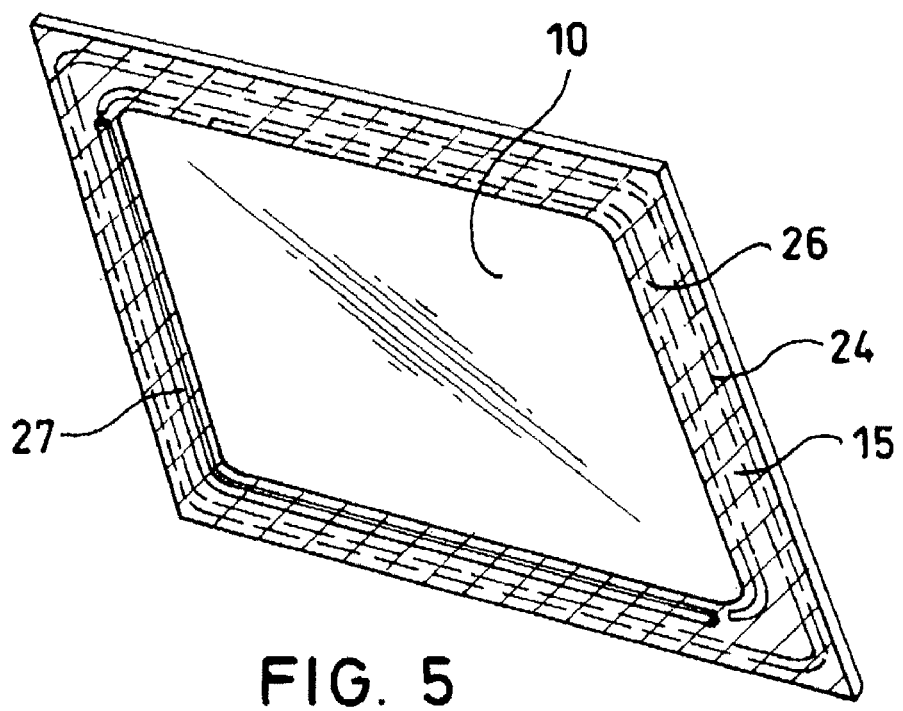
FIG. 5 is a perspective view of a pane with a seal and a cement bead before cementing to the reinforcing frame.

FIG. 5 shows a pane arrangement in the cemented state in which a pane 10 is cemented to a carrier frame which is no longer visible here. The cement bead 26 and the seal 24 from FIG. 4 are shown in broken lines, and for aesthetic reasons, the region 15 is tinted so as be sufficiently colored that these elements cannot be seen through the pane.

Figure 6:
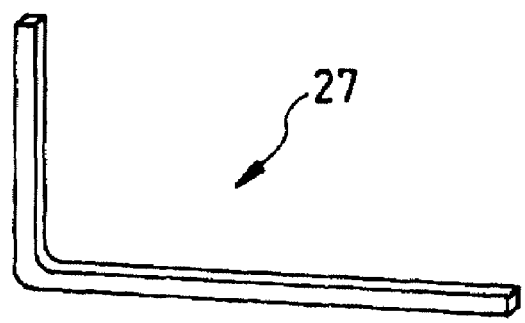
FIG. 6 shows a rigid reinforcing frame for the pane in accordance with the invention.

FIG. 6 shows a reinforcing frame 27 as can be attached to a corner of the second partial region of a pane, which corner can be bent up, in order to stabilize the second partial regions when the pane arrangement is opened. In order to do this, the reinforcing frame 27 is attached, for example, in the region of the edges 34, 36 of the pane 10 shown in FIG. 1, by its being made as a rod profile and then being cemented to the pane or by its being injection molded onto the pane as a foamed element.

Figure 7:
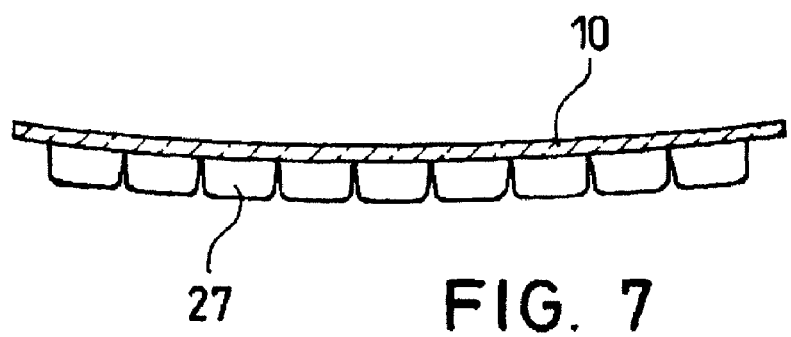
FIG. 7 shows a flexible reinforcing frame which is attached to a pane.

One alternative embodiment of the reinforcing frame is shown in FIG. 7, where a reinforcing frame 27 is in the form of a flexible articulated profile that is attached to the frame 10. Thus, the deformability of the pane can be even more specifically influenced.

Figure 8:
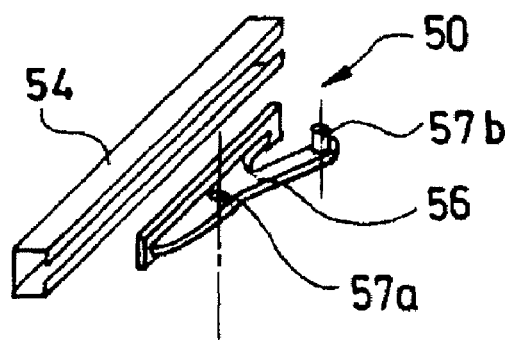
FIG. 8 is an exploded view of a raising device for a pane arrangement in accordance with the invention.

According to this invention, since a pane is flexibly bent for opening a ventilation opening, the pane must be fixed so that it does not immediately spring back again into the closed position. For this purpose, FIG. 8 shows a raising device which is formed of a guide rail 54 and a two-part tumbler lever 56 which can be swung around an axis of rotation 57a. The tumbler lever 56 is guided in the guide rail 54 which in turn is connected to a carrier frame (not shown here) such as, for example, the carrier frame 11 from FIG. 4. Thus, the guide rail 54 is connected to a part of the pane which is bent to the outside, and the tumbler lever 56 slides in the guide rail, the end of the lever facing away from the guide rail being coupled to the vehicle shell to pivot around a second axis 57b, such that displacement of the tumbler lever along the guide rail leads to bending-out of the part of the pane, by which the opening of the vehicle shell is cleared. The motion of the tumbler lever 56 in the guide rail 54 can be caused by a hand-operated mechanism or by an electric motor. If the pane arrangements in accordance with the invention are integrated into a window module or a roof module, the drive is also integrated into this module accordingly.

Alternative embodiments of the pane arrangements in accordance with the invention which differ from the panes shown so far in that they are slotted are shown in the following FIGS. 9 to 13 and 15.

Figure 9:
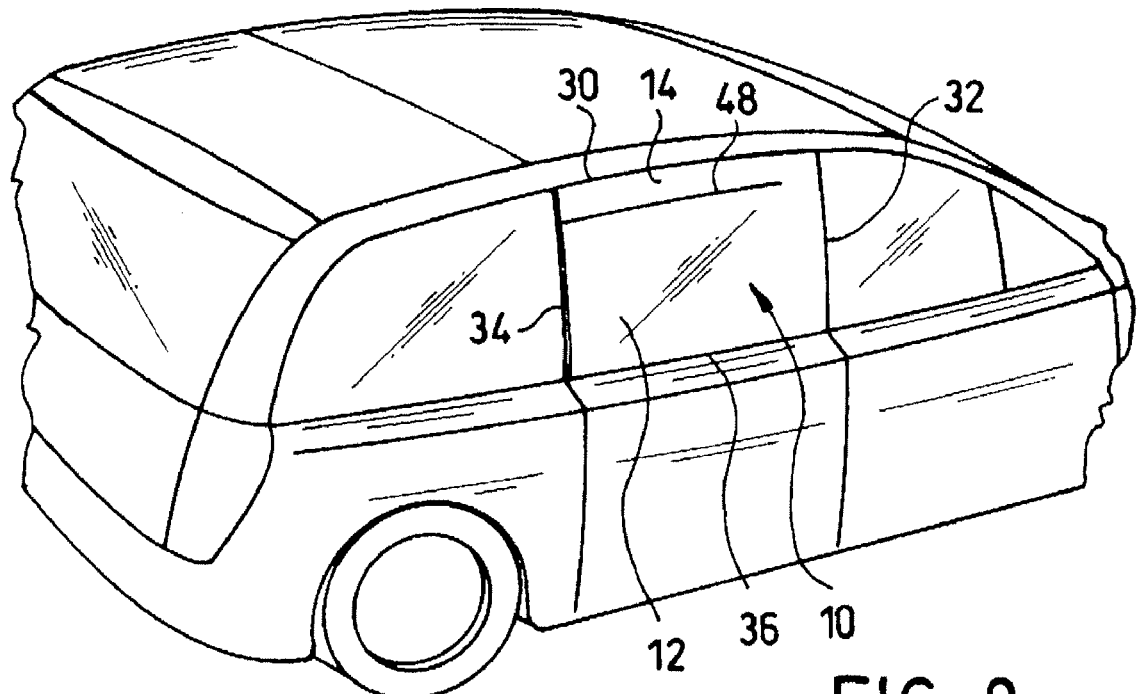
FIG. 9 is a perspective view of a motor vehicle with a pane arrangement in accordance with the invention, the pane being made in a singly slotted version.
Figure 10:
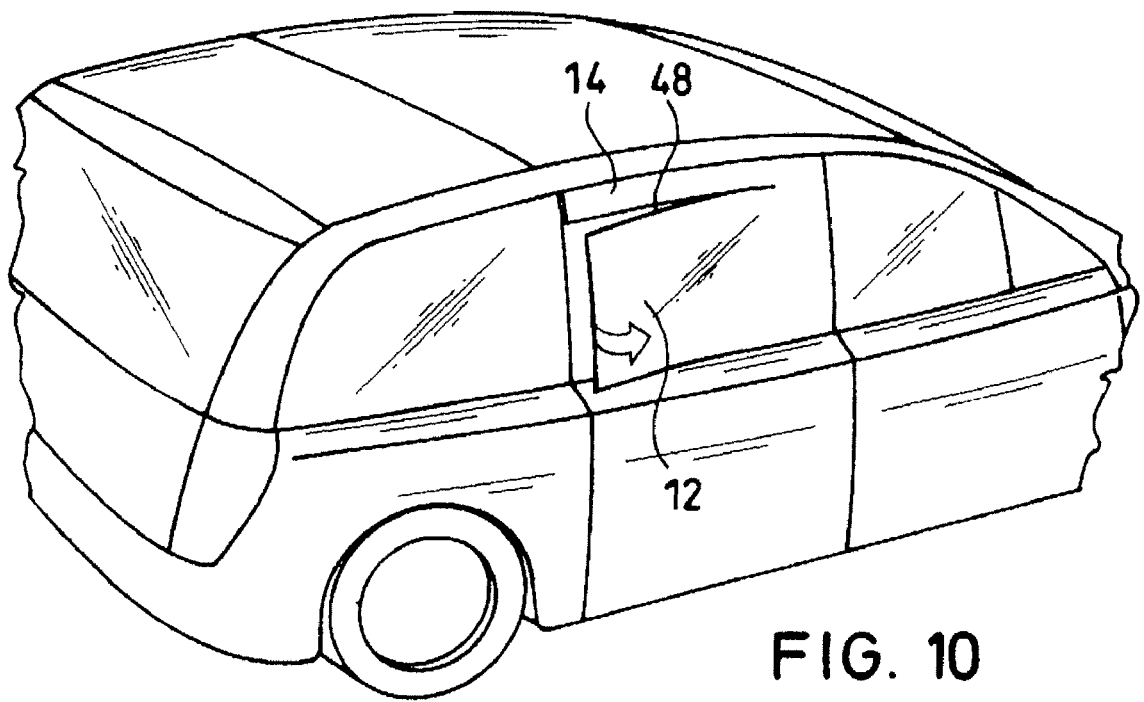
FIG. 10 is a perspective view of the motor vehicle with the side pane of FIG. 9 in the opened position.

FIG. 9 shows a singly slotted pane 10 in the closed position and FIG. 10 shows the same pane in the opened position. While for the unslotted pane shown so far a second partial region of the pane which is bent to the outside toward the opening is separated from a first partial region which remains more or less fixed in the window opening only by an imaginary parting line (see, for example, the parting line 13 in FIG. 1), for the pane 10 of FIGS. 9 & 10, this parting line is made at least partially by a slot 48. This means that the pane 10, in turn, has a second partial region 12 which is not permanently connected to the vehicle body at its edges 34, 36, and along the slot 48, and which is bent to the outside when bent into the open position as shown in FIG. 10. The remaining pane surface (first partial region 14) remains unmoved.

Figure 11:
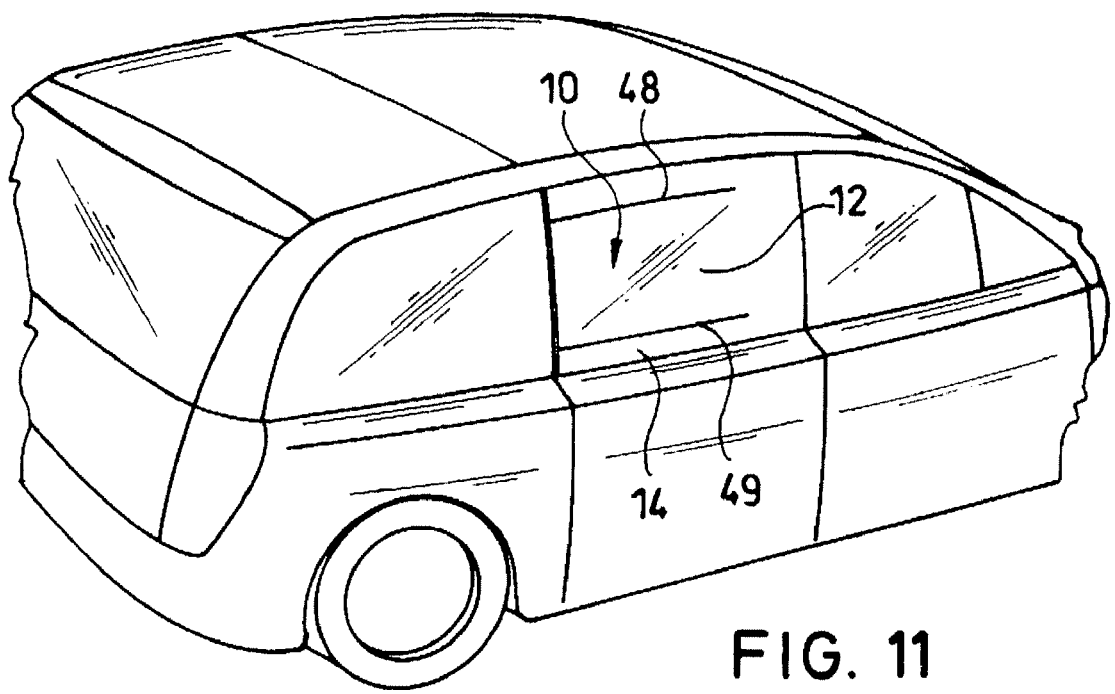
FIG. 11 is a perspective view of a motor vehicle with a double-slotted version of the pane arrangement.
Figure 12:
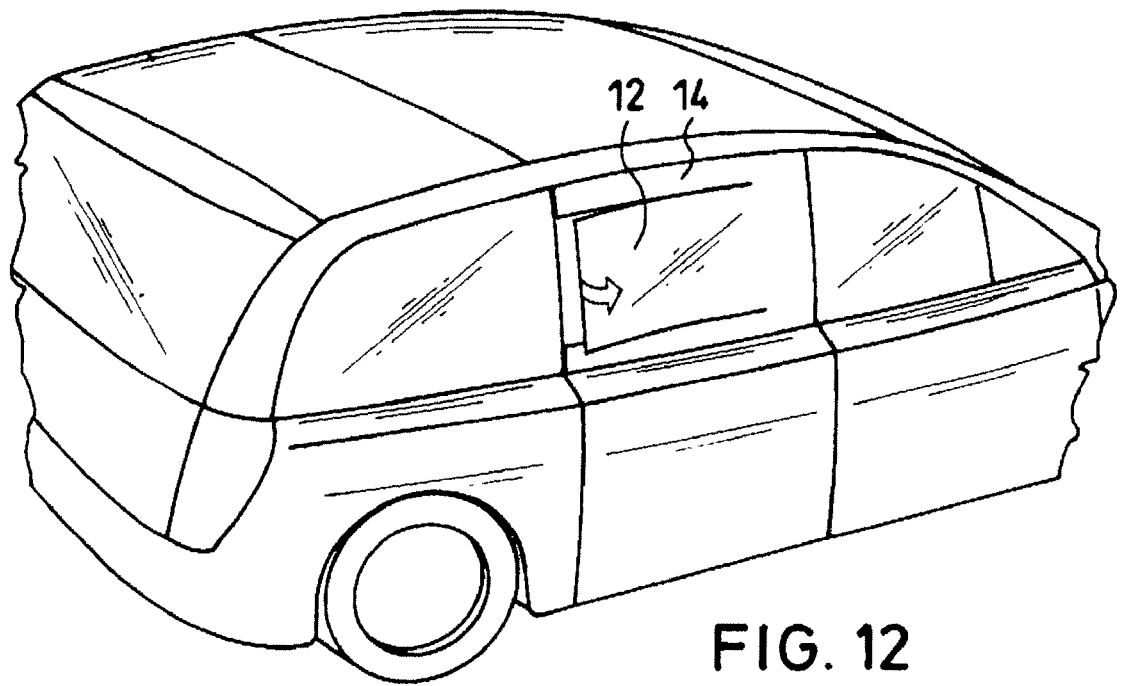
FIG. 12 is a perspective view of the motor vehicle with the side pane of FIG. 11 in the opened position.

FIG. 11 & 12 show an alternative embodiment with two straight slots 48, 49.

Figure 13:
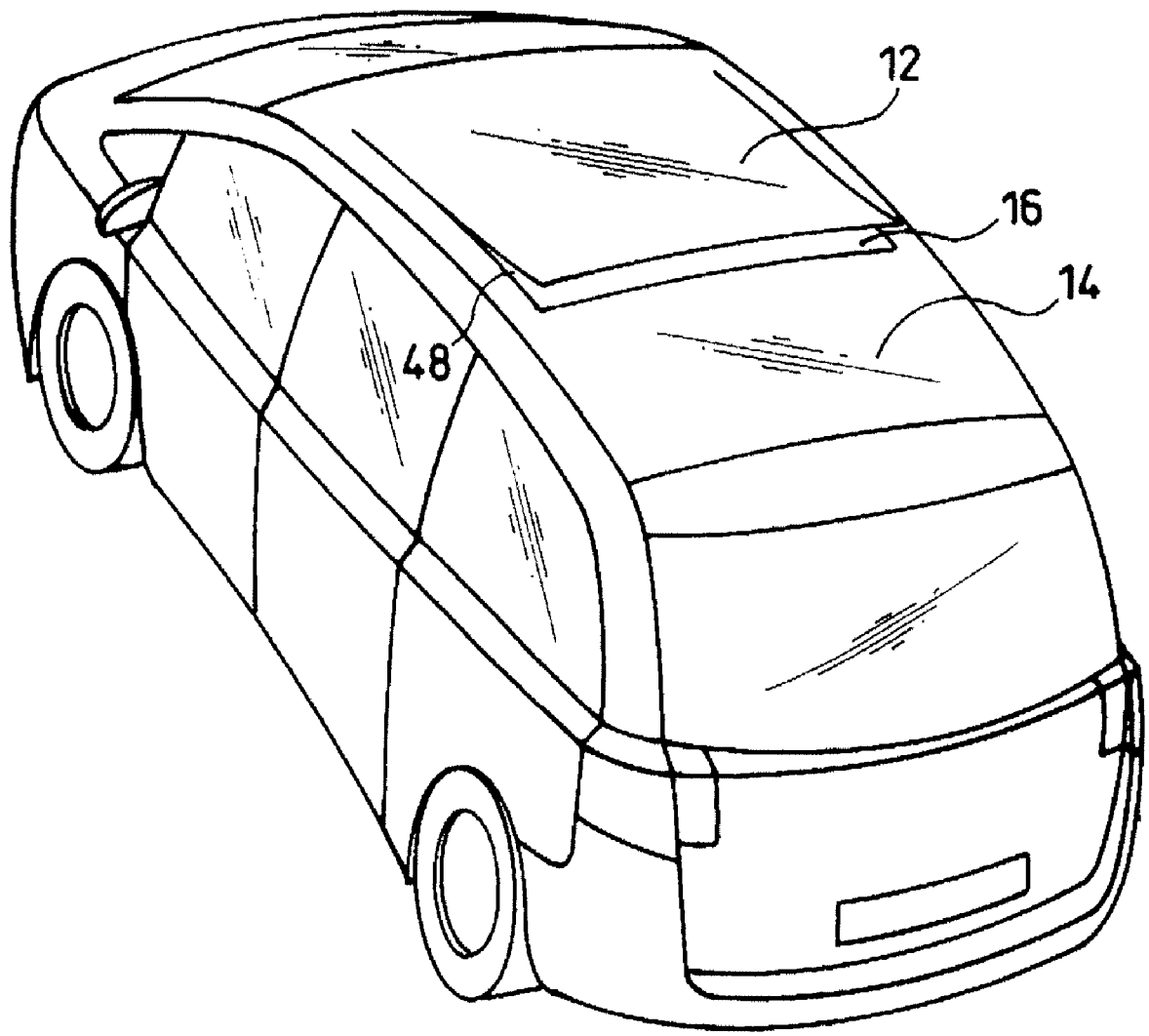
FIG. 13 shows a motor vehicle with another embodiment of a pane arrangement in accordance with the invention in a vehicle roof, the pane being slotted in a U-shape.

FIG. 13 shows a vehicle roof which has a pane 10 with a U-shaped slot 48. In this embodiment of the invention, the "tongue-shaped" pane area which is formed by the slot 48 is bent outward for opening the vehicle roof. Thus, within the U-shaped slot 48, a second partial region 12 is obtained which is swung outward by being bent up to clear the opening 16, while the first partial region 14 outside of the slot 48 remains in its initial position in both the open and closed positions. For an alternative embodiment, a corresponding slot is made V-shaped, especially for triangular side windows.

Figure 14:
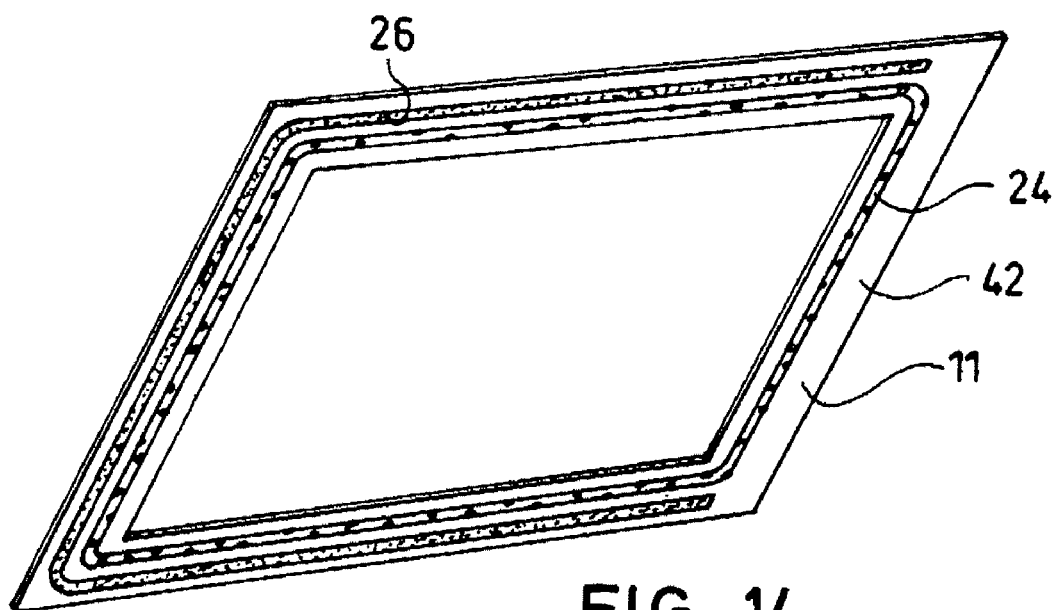
FIG. 14 is a perspective view of a reinforcing frame for a double-slotted pane.

FIG. 14 shows a carrier frame 11 as can be used, for example, in conjunction with a double-slotted pane (see, FIGS. 11 & 12). Similar to the carrier frame 11 of FIG. 4, the carrier frame 11 shown in FIG. 14 also has a peripheral seal 24 and a partially peripheral cement bead 26 in order to seal the opening in the closed state, on the one hand, and on the other hand, to fix the stationary parts of a double-slotted side pane. The cement bead 26 leaves only a single edge 42 of the carrier frame 11 exposed.

Figure 15:
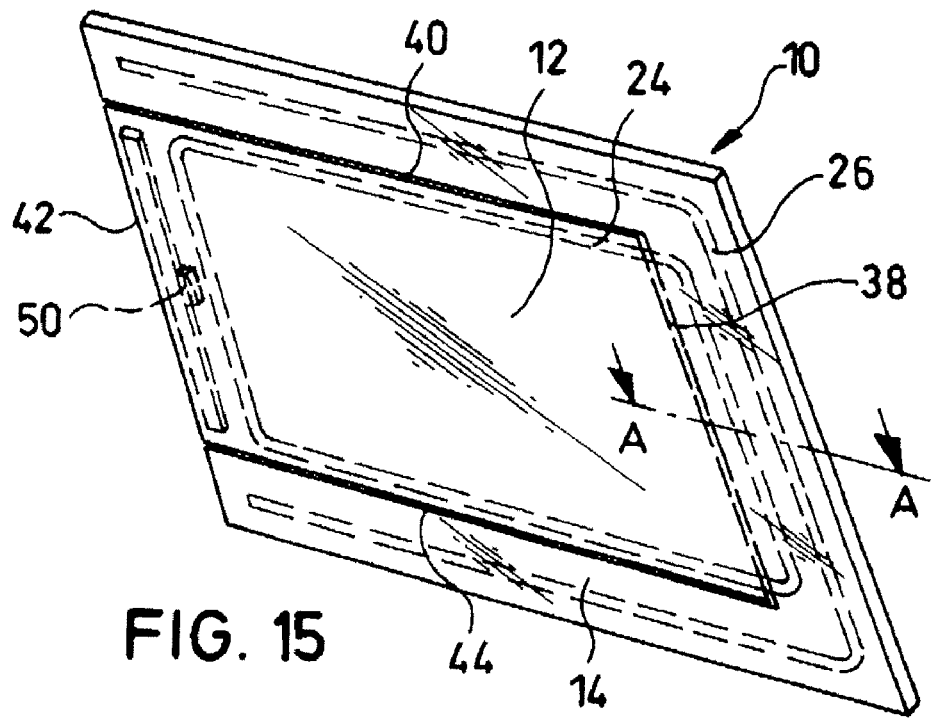
FIG. 15 is a perspective view of a pane in accordance with the invention in a double-slotted version.

FIG. 15 shows a pane 10 in the state cemented on the carrier frame, the carrier frame here being covered in turn completely by the pane. Similar to the carrier frame from FIG. 14, a carrier frame which fits the pane 10 of FIG. 15 also has a cement bead 26 and a peripheral seal 24 which are shown by broken lines. A middle, second partial region 12 is connected here on only an edge 38 to a first partial region 14 which is connected, in turn, by the cement bead 26 to the carrier frame (and thus to the vehicle body). The edges 40, 44 (formed by slots of the pane 10) and the edge 42 of the second partial region 12 are exposed, by which the second partial region 12 can be bent away for opening the pane arrangement. Thus, essentially along the edge 38 of the partial region 12, bending of the pane material can be effected.

Figure 16:
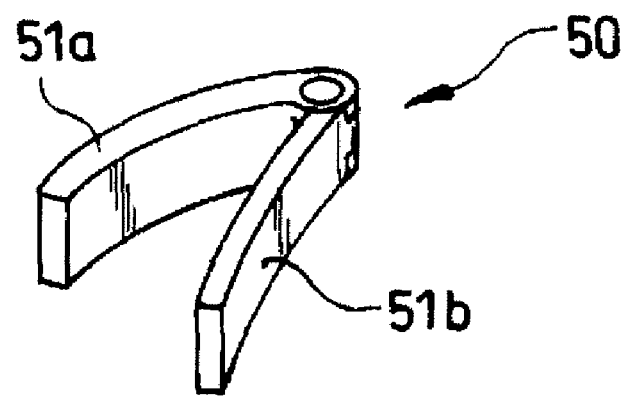
FIG. 16 is a perspective view of a raising device for a pane arrangement in accordance with the invention.

FIG. 15 schematically indicates a raising device 50 which is explained with reference to FIG. 16. The raising device 50 has two legs 51a, 51b which are connected to one another with a joint and the other end of which is connected to the vehicle shell or the second partial region 12 with the pane from FIG. 15. Thus, to open the pane arrangement (and to bend out the second partial region 12 from FIG. 15) the two legs 51a, 51b can be swung apart from one another such that they form a more obtuse angle, while to close the pane arrangement the two legs are pivoted such that they lie on one another.

Figure 17:
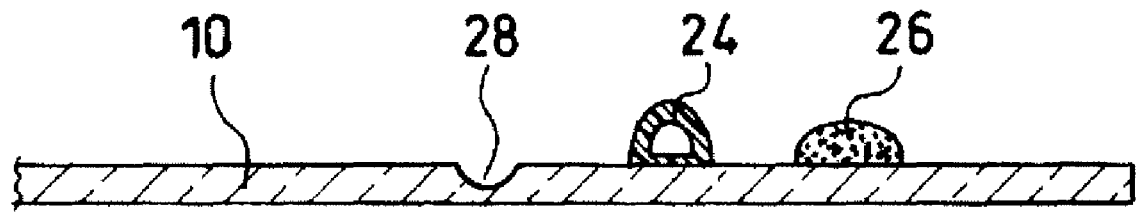
FIG. 17 is a cross-sectional view through a partial region of a pane in accordance with the invention.

FIG. 17 shows a partial section along line A-A of FIG. 15 in which cross sections through the seal 24 and cement bead 26 are indicated. The material weakening 28 is likewise shown which was specifically formed in the region of the edge 38 (see FIG. 15) in order to facilitate material bending in this transition region between the second partial region 12 and the first partial region 14 when the window is pushed up/out.

Figure 18:
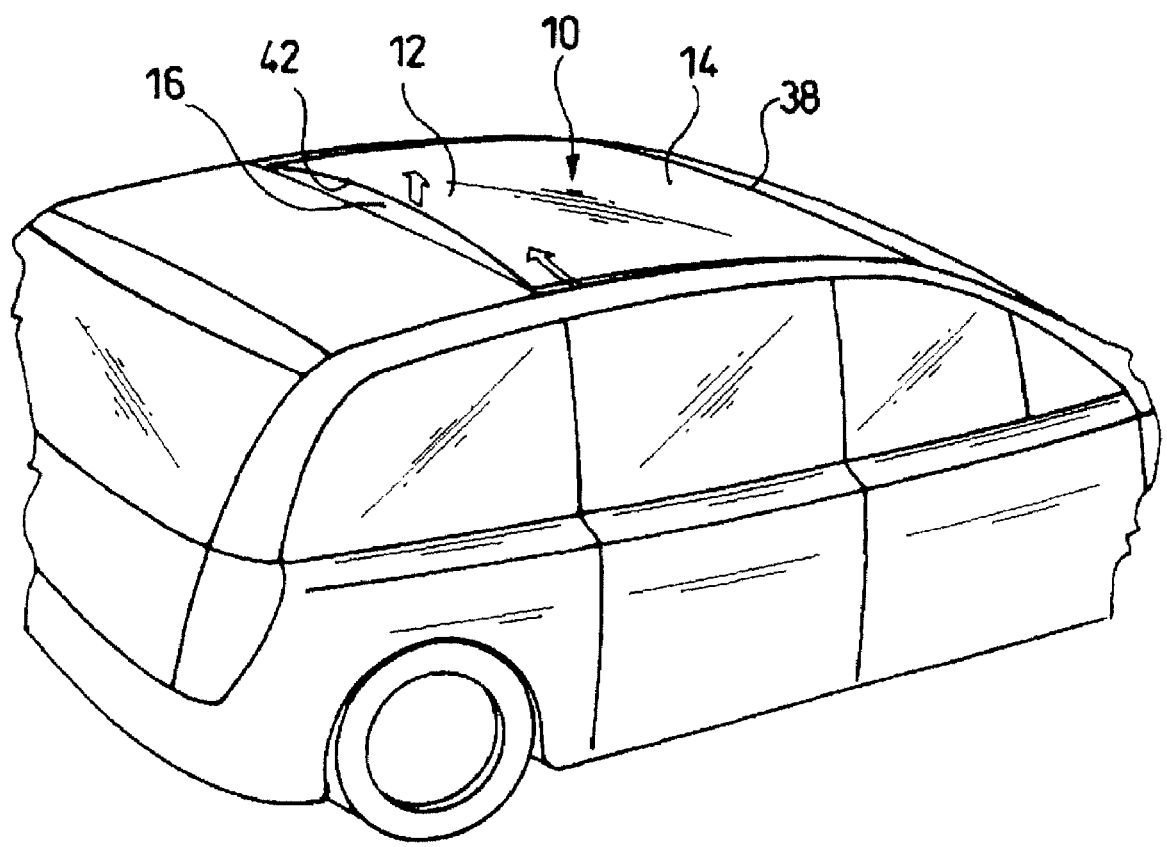
FIG. 18 is a perspective view of a pane arrangement in accordance with the invention for a vehicle roof.

One alternative manner of bending the pane 10 up is shown in FIG. 18. While in the embodiments of the invention shown so far (except for FIG. 3), the panes have been bent to the outside along a center diagonal or along one edge, the pane 10 of FIG. 18 is bent outward in an arc shape to clear an opening 16. In this case, the forward edge 38 of the pane 10 is permanently connected to the vehicle roof, while the other edges do not have a fixed connection to the vehicle roof. By the two rear corners of the pane 10 being moved toward one another, the arc-shaped outline on the rear edge 42 of the pane 10 is established.

Figure 19:
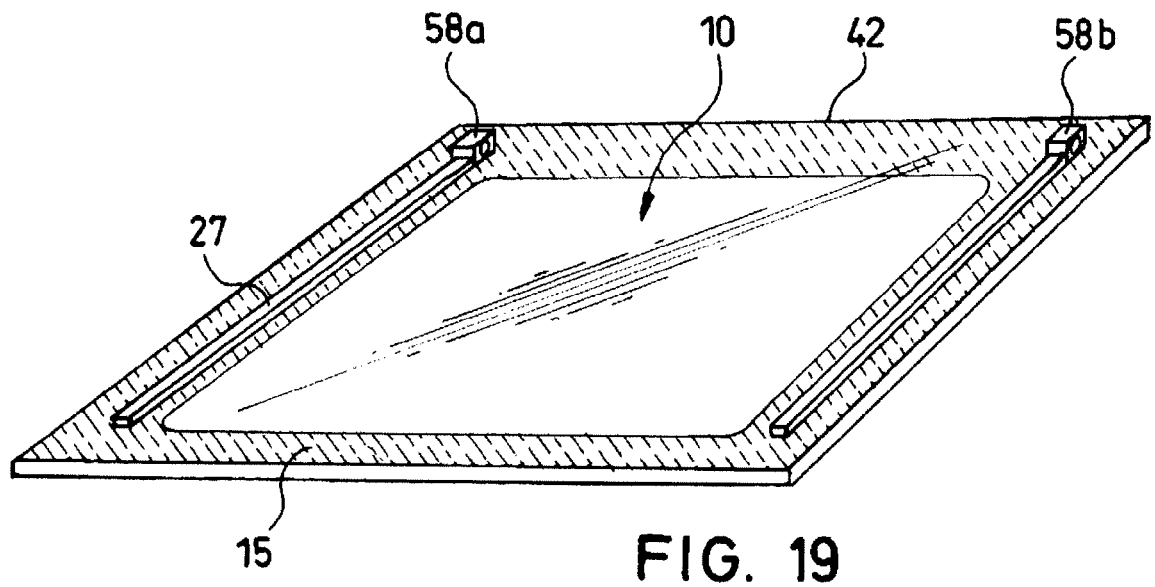
FIG. 19 shows a pane for the pane arrangement in FIG. 18.

FIG. 19 shows a pane 10 as can be used for such "arc torsion" for the openable vehicle roof from FIG. 18 or also a spoiler element. The pane 10 has a two-part reinforcing frame 27 which is provided on the rear edge 42 of the pane 10 with two fastening elements 58a, 58b. FIG. 19 shows a rotated pane 10; this means that with the pane installed the two-part reinforcing frame 27 lies in the direction of the vehicle interior under the pane. To prevent looking from outside through the transparent pane 10 onto the reinforcing frame 27, the pane 10 is provided with a peripheral tinted region 15, which can be applied, for example, by screen printing on the bottom of the pane or even in injection molding of the transparent pane 10 can be injected on as a second, nontransparent component of polycarbonate.

Figure 20:
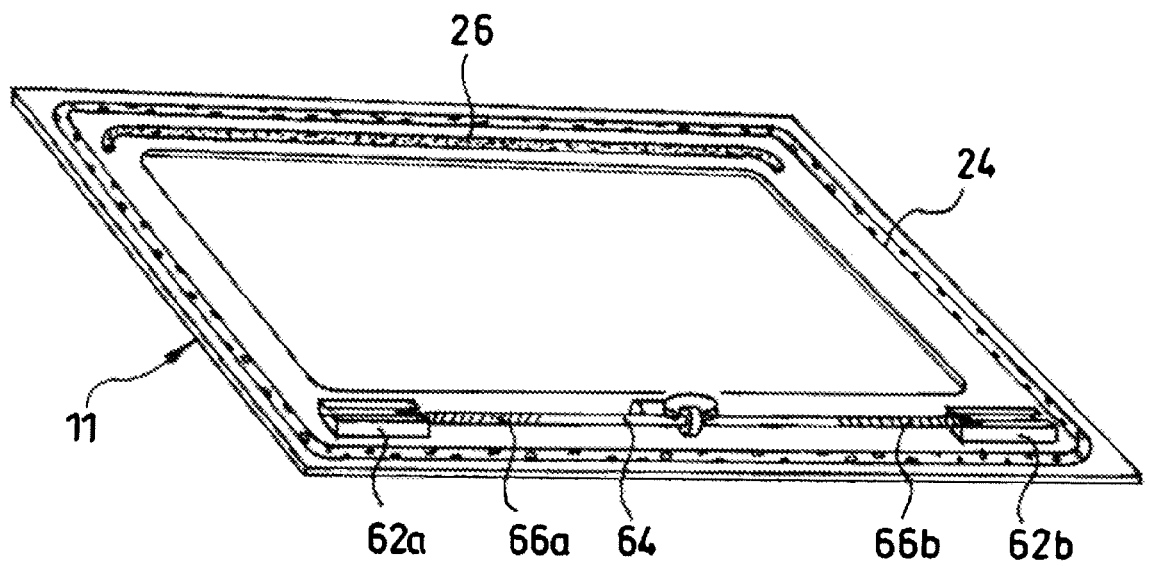
FIG. 20 shows a reinforcing frame for the pane in FIG. 19.

FIG. 20 shows a carrier frame 11 for the pane 10 from FIG. 19 which in addition to the seal 24 and cement bead 26 in the region of the forward edge of the roof opening has a rod 64 with opposite threaded sections 66a, 66b. This rod 64 with threaded sections 66a, 66b interacts with the fastening elements 58a and 58b of FIG. 19 such that, when the rod 64 turns, the two-part reinforcing frame 27 of the pane 10 from FIG. 19 can be moved. In particular, the fastening elements 58a, 58b depending on the direction of rotation of the rod can be moved toward or away from one another so that the indicated elements cause a pulling or pressing action on the rear edge of the pane 10. In this case, a pulling action means that the rear edge of the pane is twisted such that it bends in an arc shape to the outside, as shown in FIG. 18. In order to prevent complete lifting of the pane 10 in the region of its rear edge, for example, by a head wind, the carrier frame 11 of FIG. 20 preferably has two guide rails 62a, 62b by means of which the pane is guided transversely to the direction of travel in the region of its fastening elements 58a, 58b.

Figure 21:
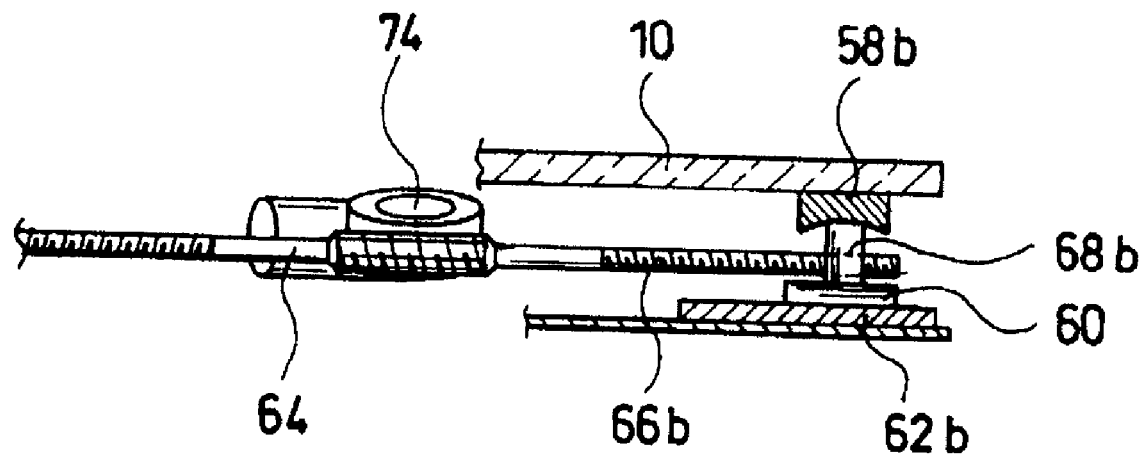
FIG. 21 is a side view a portion of the pane in FIGS. 18 to 20, a rod with a threaded section for bending up the pane.
Figure 22:
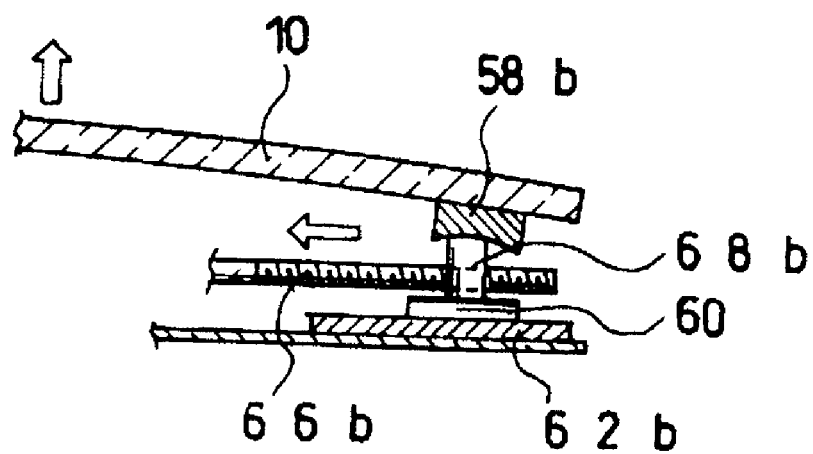
FIG. 22 shows the arrangement of FIG. 21 in the bent-up state of the pane.

FIG. 21 is a partial view of the pane arrangement from FIG. 20 in the region of the guide rail 62b. Driven by a worm wheel 74, the rod 64 and thus its threaded section 66b turn in an opposing thread 68b which is connected to the fastening element 58b with a capacity to tilt. In this way, the pane 10 is shifted to the left in this region, as is shown in FIG. 22. Accordingly, the other corner of the pane 10 (not shown here, see region around 58a, 62a in FIG. 20) is moved in the opposite direction, by which the pane 10 is tensioned upward in an arc shape as indicated by the arrow.

What is claimed is:

1. Pane arrangement for opening and closing an opening provided in the outer shell of the motor vehicle, comprising:
   a flexible pane having a closed position in which the opening is tightly closed, and an open position in which the opening is partially cleared, the flexible pane being connectable in a hinge-free manner to the vehicle, and
   wherein the flexible pane has at least a first partial region for permanent connection to a support surface, and at least a second partial region which is bendable out of the closed position by resilient deformation of the pane for producing said open position,
   at least one raising device for producing said resilient deformation of the second partial region of the pane, and
   wherein the raising device comprises a guide rail and a raising element for being guided therein, the guide rail being mountable on one of the vehicle or the second partial region of the pane, and the raising element being connectable to the other of the second partial region of the pane and the vehicle such that displacement of the raising element in the guide rail leads to the second partial region being bent up or arched.

2. Pane arrangement as claimed in claim 1, wherein the flexible pane is a cover panel for a roof opening.

3. Pane arrangement as claimed in claim 2, wherein the opening is a roof opening to which said first partial region is permanently attached.

4. Pane arrangement as claimed in claim 1, wherein the flexible pane is a window pane for a window opening.

5. Pane arrangement as claimed in claim 1, wherein said support surface comprises a carrier frame for surrounding the opening and wherein at least said first partial region of the pane is permanently connected to the carrier frame.

6. Pane arrangement as claimed in claim 5, wherein the carrier frame is made of one of sheet metal and plastic.

7. Pane arrangement as claimed in claim 5, wherein the permanent connection of at least the first partial region to the carrier frame is provided by means of the carrier frame having been foamed around an edge the first partial region.

8. Pane arrangement as claimed in claim 5, wherein the permanent connection of at least the first partial region to the carrier frame is a cemented connection.

9. Pane arrangement as claimed in claim 1, wherein the at least one second partial region of the pane is supported at least partially by a reinforcing frame that is attached thereto.

10. Pane arrangement as claimed in claim 9, wherein the reinforcing frame is flexible.

11. Pane arrangement as claimed in claim 1, wherein at least one sealing element is provided between the second partial region and the support surface.

12. Pane arrangement as claimed in claim 11, wherein the at least one sealing element completely surrounds the opening.

13. Pane arrangement as claimed in claim 1, wherein the pane is transparent or translucent.

14. Pane arrangement as claimed in claim 1, wherein the pane is a plastic pane.

15. Pane arrangement as claimed in claim 14, wherein the plastic is polycarbonate.

16. Pane arrangement as claimed in claim 1, wherein the pane has an essentially tetragonal shape with two adjoining edges of the pane bordering the first partial region, two other adjoining edges of the pane bordering the second partial region.

17. Pane arrangement as claimed in claim 1, wherein a material weakening is provided in the pane between the first partial region and the second partial region.

18. Pane arrangement as claimed in claim 1, wherein the pane an essentially tetragonal shape with three adjoining edges of the pane bordering the second partial region, and the fourth edge of the pane bordering the first partial region.

19. Pane arrangement as claimed in claim 1, wherein the pane has at least one slot which separates the first partial region from the second partial region.

20. Pane arrangement as claimed in claim 19, wherein the slot is essentially U-shaped in an inner region of the pane.

21. Pane arrangement as claimed in claim 2, wherein the at least raising device has a raising clement which is coupled to the pane in the second partial region.

* * * * *